United States Patent
Kohlberger

(10) Patent No.: US 10,026,948 B2
(45) Date of Patent: Jul. 17, 2018

(54) SAFETY ELEMENT FOR BATTERY CELL

(71) Applicants: Robert Bosch GmbH, Stuttgart (DE); Samsung SDI Co., Ltd., Yongin-si, Gyeonggi-do (KR)

(72) Inventor: Markus Kohlberger, Stuttgart (DE)

(73) Assignees: Robert Bosch GmbH, Stuttgart (DE); Samsung SDI Co., Ltd., Yongin-si, Gyeonggi-do (KR)

( * ) Notice: Subject to any disclaimer, the term of this patent is extended or adjusted under 35 U.S.C. 154(b) by 303 days.

(21) Appl. No.: 14/202,097

(22) Filed: Mar. 10, 2014

(65) Prior Publication Data

US 2014/0272491 A1    Sep. 18, 2014

(30) Foreign Application Priority Data

Mar. 13, 2013  (DE) .................. 10 2013 204 341

(51) Int. Cl.
| | |
|---|---|
| *H01M 2/34* | (2006.01) |
| *H01M 2/30* | (2006.01) |
| *H01M 2/02* | (2006.01) |
| *H01M 2/26* | (2006.01) |
| *H01M 10/0525* | (2010.01) |

(52) U.S. Cl.
CPC ........... *H01M 2/34* (2013.01); *H01M 2/0262* (2013.01); *H01M 2/0285* (2013.01); *H01M 2/30* (2013.01); *H01M 2/305* (2013.01); *H01M 2/345* (2013.01); *H01M 2/348* (2013.01); *H01M 2/26* (2013.01); *H01M 10/0525* (2013.01); *H01M 2200/103* (2013.01); *H01M 2200/20* (2013.01); *H01M 2220/20* (2013.01); *Y02E 60/122* (2013.01)

(58) Field of Classification Search
CPC ...... H01M 2/34; H01M 2/0285; H01M 2/345; H01M 2/0262; H01M 2/348; H01M 2/305; H01M 2/30; H01M 2/26; H01M 10/0525; H01M 2200/103; H01M 2200/20; H01M 2220/20; Y02E 60/122
See application file for complete search history.

(56) References Cited

U.S. PATENT DOCUMENTS

| | | | |
|---|---|---|---|
| 5,707,756 A | 1/1998 | Inoue et al. | |
| 6,228,523 B1 | 5/2001 | Azema | |
| 2009/0176147 A1* | 7/2009 | Hatanaka | H01M 4/62 429/94 |
| 2009/0317712 A1* | 12/2009 | Kim | H01M 2/24 429/164 |

(Continued)

FOREIGN PATENT DOCUMENTS

| | | |
|---|---|---|
| CN | 101950812 A | 1/2011 |
| CN | 102646807 A | 8/2012 |

(Continued)

OTHER PUBLICATIONS

Machine translation of Yukita JP8-185850, Jul. 16, 1996.*

*Primary Examiner* — Lisa S Park
(74) *Attorney, Agent, or Firm* — Maginot, Moore & Beck LLP

(57) ABSTRACT

A galvanic element includes a housing, a positive terminal, a negative terminal, and a collector associated with each terminal. The collectors are configured to make contact with an electrode assembly in the interior of the housing. The housing is a stainless steel housing which has a negative potential or a neutral potential.

5 Claims, 2 Drawing Sheets

(56) References Cited

U.S. PATENT DOCUMENTS

| | | | | |
|---|---|---|---|---|
| 2010/0247987 A1* | 9/2010 | Holung | ............... | H01M 10/052 429/62 |
| 2011/0039136 A1* | 2/2011 | Byun | .................. | H01M 2/0404 429/56 |
| 2011/0117393 A1* | 5/2011 | Borel | ..................... | H01H 35/34 429/7 |
| 2011/0244281 A1* | 10/2011 | Byun | ...................... | H01M 2/22 429/62 |
| 2011/0287300 A1* | 11/2011 | Byun | ................... | H01M 2/202 429/158 |
| 2011/0305928 A1* | 12/2011 | Kim | ........................ | H01M 2/34 429/61 |

FOREIGN PATENT DOCUMENTS

| | | |
|---|---|---|
| DE | 10 2008 063 136 A1 | 9/2009 |
| DE | 10 2010 049 611 A1 | 6/2011 |
| DE | 10 2010 036 379 A1 | 1/2012 |
| EP | 2 385 567 A1 | 11/2011 |
| EP | 2 403 036 A1 | 1/2012 |
| EP | 2 487 735 A2 | 8/2012 |
| EP | 2 515 362 A2 | 10/2012 |
| EP | 2 838 138 A1 | 2/2015 |

* cited by examiner

SAFETY ELEMENT FOR BATTERY CELL

This application claims priority under 35 U.S.C. § 119 to patent application number DE 10 2013 204 341.4, filed on Mar. 13, 2013 in Germany, the disclosure of which is incorporated herein by reference in its entirety.

BACKGROUND

Lithium-ion battery cells are used as traction batteries for vehicles which have an electric drive. A plurality of lithium-ion battery cells are connected to one another to form a battery module. The individual lithium-ion battery cells comprise at least one electrode which can intercalate lithium ions ($Li^+$) or deintercalate said lithium ions again.

DE 10 2008 063 136 A1 discloses a method and an apparatus for protecting a lithium-ion battery in the event of thermal and/or electrical overload as a result of a malfunction, for example a short circuit or overcharging. The solution in accordance with DE 10 2008 063 136 A1 can be used in a hybrid vehicle or an electric vehicle. Battery electronics monitor the operating state of the lithium-ion battery in respect of the current value, the voltage value, the temperature and the cell internal pressure. In the event that stored limit values are exceeded, the lithium-ion battery is disconnected from the electrical distribution system of the vehicle by means of a disconnecting device. The disconnecting device is arranged between the lithium-ion battery and the electrical distribution system, wherein the disconnecting device can be in the form of a relay, reversible fuse or pyrotechnic switch. The disconnecting device is integrated in a current path, wherein, on activation, the current path and therefore the current flow are interrupted.

DE 10 2010 049 611 A1 discloses a battery module unit for vehicles comprising a multiplicity of series-connected individual battery cells, which are separated into submodules in the event of a fault at predetermined desired breaking points by a safety device, wherein the system voltage of said battery module unit is below a critical voltage. The safety device comprises a multiplicity of identical or differently configured disconnecting means which are activated by a control unit, wherein mechanical damage to at least one individual cell is detected directly or indirectly by virtue of variables acting as an indication of this, for example by a crash or airbag sensor.

DE 10 2010 036 379 A1 relates to a high-voltage battery for hybrid or electric vehicles, comprising battery modules which are connected to one another, wherein disconnecting means are provided which are arranged outside an electrical connection in the normal operating mode. As a result, no additional electrical resistance is represented. An accident detected by accident sensors initiates activation of the disconnecting means.

In the context of lithium-ion battery cell technology, the overcharge response of the lithium-ion battery cells, or of the completely interconnected lithium-ion battery, in this context battery module can also be referred to here, has proved to be critical. If lithium-ion battery cell are charged beyond the maximum permissible voltage, this results in damage to the cell even as far as an operation which is also referred to as thermal runaway. In the event of such thermal runaway of the battery cell, it may arise that the cell opens or even that the battery cell bursts or explodes. Such thermal runaway of the battery cell represents the greatest assumed accident in connection with lithium-ion battery cells.

The overcharge operation is stopped by safety devices such as, for example, fuses, since the voltage drop or the short circuit occurring is identified by the battery management system of the battery or the charging operation is interrupted by the short-circuiting of the charger. If, however, the current continues to flow, there is the risk of the material of the membrane of the overcharge safety device (OSD) fusing. In this case, current flows into the battery cell again, or a new galvanic element is formed, comprising what was previously the anode against the housing, manufactured from aluminum, of the battery cell. This in turn enables the occurrence of voltage flashovers or electrolysis, in which a growth of dendrites occurs in the interior of the battery cell. Depending on the voltage level, this results directly in an arc; there is the further possibility of a short circuit forming and the reaction starting again and possibly resulting in a fire. The shielding of the electrodes of the electrode assembly with respect to one another is only possible with difficulty since the entire cell housing acts as an electrode.

Even in the event of the occurrence of an external short circuit, the previously used fuse trips and thus disconnects the electrode assembly. In this case, a new galvanic element, i.e. comprising what was previously the anode against the battery cell housing manufactured from aluminum, is formed directly. The voltage level of the remaining, possibly still intact battery cells is now present there, which results in the same response as that described above. Experiments which were aimed at integrating the fuse in the negative collector, which is generally manufactured from copper, have failed.

SUMMARY

The disclosure proposes configuring a galvanic element, in particular a lithium-ion battery cell, which comprises a housing, a negative terminal, a positive terminal and collectors associated with each of said terminals, in such a way that the housing is in the form of a stainless steel housing which is at a negative potential or at neutral potential. While previously used hardcase housings have been manufactured from aluminum which has an electrical conductivity of the order of magnitude of $36.59 \times 10^6$ S/m, stainless steel housings used according to the disclosure have an electrical conductivity which is of the order of magnitude of $1.4 \times 10^6$ S/m. In addition, housings manufactured from stainless steel which are used in the context of lithium-ion technology have firstly proven successful and are no more expensive than housings for accommodating battery cells which are manufactured from aluminum.

In an advantageous possible embodiment, the negative terminal of the battery cell and a collector or current collector associated therewith, which connects an electrode assembly in the interior of the housing to the negative terminal, are manufactured from copper (Cu), while a positive terminal of the battery cell and a collector or current collector associated therewith are manufactured from aluminum (Al).

The galvanic element proposed according to the disclosure comprises a fuse in the current collector or collector which is associated with the positive terminal and is manufactured from aluminum. In the event of a short circuit, the fuse fuses, with the result that the current flow between the electrode assembly and the positive terminal is interrupted. Possible arcs or possible growth of dendrites are only possible in the upper part of the terminal which is not at the potential of the stainless steel housing, in the solution according to the disclosure the positive terminal, up to the fuse. The upper part of the fuse can be shielded by the use of a plastics part. In the solution proposed according to the disclosure, in which the housing, in particular the stainless steel housing of the galvanic element is at negative potential, or at neutral potential, the overcharge safety device (OSD) is configured in such a way that the membrane integrated in the stainless steel housing is likewise manufactured from stainless steel material or from nickel. The fuse which is associated with the current collector or collector, which is connected to the positive terminal of the galvanic element, is provided, for example, by an area of weakened cross section in the collector or current collector with which the electrode assembly is in contact. The area of weakened cross section may be an opening in the material of the collector, which is in particular in the form of a slot.

In an advantageous variant embodiment of the concept on which the disclosure is based, there is the possibility of, in the housing consisting of stainless steel of the galvanic element, connecting said housing to neutral potential and of assigning two membranes which are deformed by a pressure occurring in the interior of the housing as overcharge safety device at each of the connection terminals, i.e. the positive terminal and the negative terminal.

The solution proposed according to the disclosure for the housing of a galvanic element or an overcharge safety device integrated therein uses a stainless steel housing as a basis which has already proved successful in use and is not as expensive as the previously used aluminum housing in respect of costs. In the event of the occurrence of a short circuit, the fuse which is in the collector which is connected to the positive terminal of the galvanic element fuses, with the result that the current flow between the positive terminal and the electrode assembly is interrupted. Possible arcs or growth of dendrites are only possible in the upper part of the terminal up to the fuse, wherein said fuse is shielded by a plastics part. This is in particular the region of the collector or the current collector which is in front of the fuse and which is furthermore connected externally to the terminal. By virtue of the fuse fusing, the rest of the collector or current collector which is connected to the electrode assembly is no longer connected to the positive terminal, and the electrical connection is interrupted.

The overcharge safety device integrated according to the disclosure in the stainless steel housing comprises at least one membrane, which can be manufactured from stainless steel or nickel. The mentioned materials have higher melting points than the previously used materials for membranes for overcharge safety devices. In general, in the combination comprising stainless steel housing with positive terminal manufactured from aluminum, namely the solution proposed according to the disclosure, the growth of dendrites is delayed.

BRIEF DESCRIPTION OF THE DRAWINGS

The disclosure will be described in more detail below with reference to the drawing, in which.

DETAILED DESCRIPTION

Figure 1:
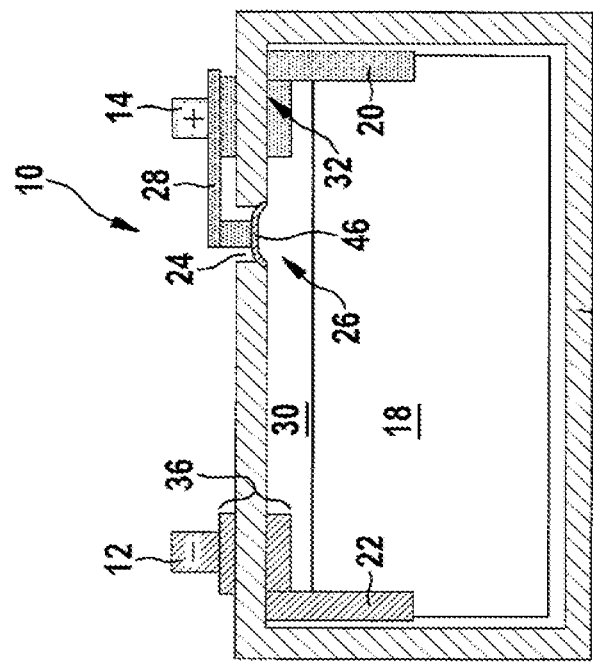
FIG. 1 shows a possible embodiment proposed according to the disclosure of a housing for a galvanic cell.

The illustration shown in FIG. 1 shows a first variant embodiment of the galvanic element proposed according to the disclosure, which has an overcharge safety device (OSD).

FIG. 1 illustrates the galvanic element 10, which is preferably a lithium-ion battery cell. In the variant embodiment shown in FIG. 1, the housing of the galvanic element is in the form of a stainless steel housing 34. The stainless steel housing 34 of the galvanic element 10 in the illustration shown in FIG. 1 is at negative potential or at neutral potential. A negative terminal 12 of the galvanic element 10 is manufactured from copper. In contrast to the negative terminal 12, a positive terminal 14 of the galvanic element 10, as shown in the illustration in FIG. 1, is manufactured from aluminum (Al). The stainless steel housing 34, in this case indicated by reference symbol 36, is at negative potential or at neutral potential. Furthermore, the stainless steel housing 34 comprises an opening 24, with a stainless steel or nickel membrane 46 let into said opening. The stainless steel or nickel membrane 46 is deformable as a result of an excess pressure arising in the interior 30 of the stainless steel housing 34 in the event of a collision or an accident and can, as indicated in connection with FIG. 2, be curved outwards in such a way that contact is made with a protrusion 28 of the positive terminal 14 manufactured from aluminum and a short circuit occurs there.

In the event of the occurrence of a short circuit, the fuse 32 which is arranged in the collector or current collector 20 consisting of aluminum, via which the electrode assembly 18 of the galvanic element 10 is connected to the positive terminal 14, fuses. In the event of fusing of the fuse 32, the current flow into the galvanic element 10 is interrupted since the electrode assembly 18 downstream of the fuse 32 is now insulated with respect to the stainless steel housing 34. In the event of a short circuit, a short-circuit current flow path is produced which runs from the negative terminal 12 via the cover of the stainless steel housing 34, the outwardly curved stainless steel membrane or nickel membrane 46 integrated therein to the positive terminal 14. A shield 44 manufactured from plastics material, for example, is located above the fuse 32 (cf. the illustration shown in FIG. 3).

If overcharging occurs during charging of the galvanic element 10, for example as a result of a faulty charger or the like, an excess pressure is produced in the interior 30 of the stainless steel housing 34, which excess pressure causes the stainless steel/nickel membrane 46 of the overcharge safety device 26 to curve outwards, with the result that contact is made with the anvil-like projection, the protrusion 28, which is formed at the positive terminal 14 manufactured from aluminum and a short circuit occurs.

Figure 3:
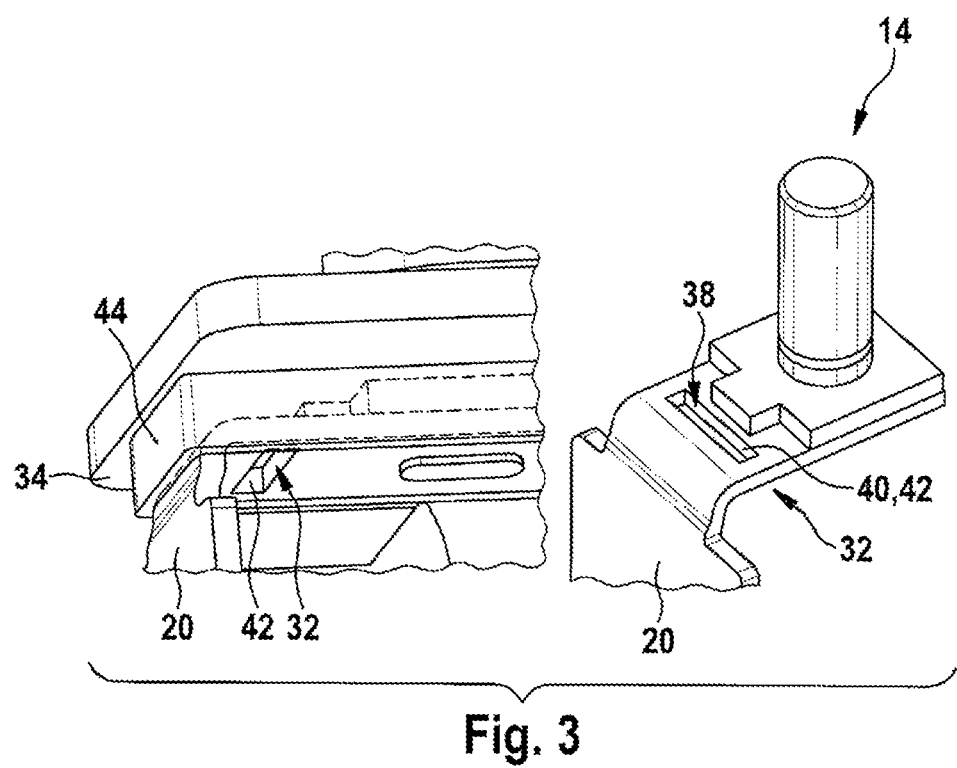
FIG. 3 shows a schematic illustration of a fuse formed in a current collector or collector.

The fuse 32 is preferably in the form of an area of weakened cross section 38, cf. the illustration shown in FIG. 3. Preferably, the fuse 32 is integrated in the collector or current collector 20, which is connected to the positive terminal 14 and is manufactured from aluminum. The material aluminum in this context has the advantage that it fuses at a relatively low temperature, but, as a result of the oxide layer, there is no dripping of fuse material and this material in particular does not anneal. The avoidance of annealing considerably reduces the risk of the electrolyte which is provided in the electrode assembly 18 igniting.

Figure 2:
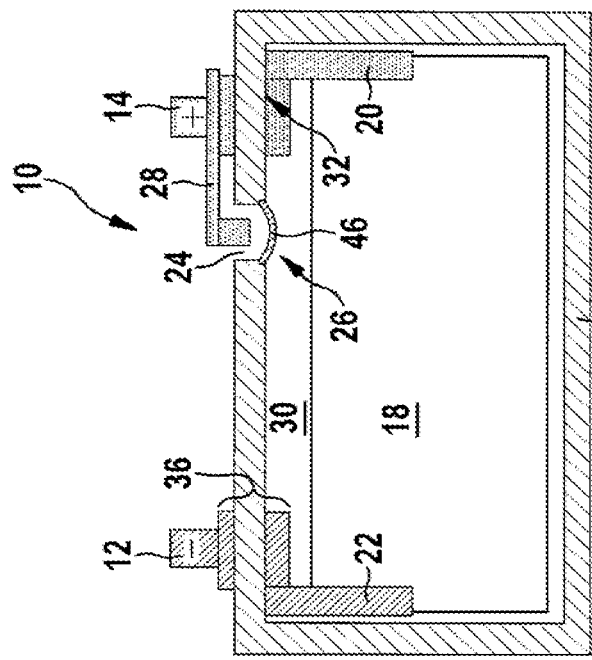
FIG. 2 shows the response of an overcharge safety device containing a deformable membrane.

Since, in the solution proposed according to the disclosure, cf. the illustration shown in FIGS. 1 and 2, a stainless steel membrane or a nickel membrane 46 is used as part of the overcharge safety device 26, which membrane has a considerably higher melting point, the risk of the stainless steel membrane 46 or nickel membrane 46 fusing is considerably reduced, with the result that the possibility of current flowing back into the galvanic element 10 or a new galvanic element comprising what was previously the anode and the housing 34 being formed is prevented. By virtue of the measures proposed according to the disclosure, it is possible to avoid a situation in which voltage flashovers occur in the interior 30 of the stainless steel housing 34; in addition, the occurrence of electrolysis alongside a growth of dendrites in the interior of the stainless steel housing 34 can be effectively suppressed.

FIG. 3 shows a schematic of the fuse formed in the positive collector.

The positive collector 20 is connected to the positive terminal 14. Preferably, this arrangement comprising the positive terminal 14 and the positive collector 20 is integral and is manufactured from aluminum. The fuse 32 in the variant embodiment shown in FIG. 3 is in the form of an area of weakened material 38 in the form of a slot 42. Instead of the slot 42, other geometries for the opening 40 which represent an area of weakened material 38 are of course also possible.

Previously used membranes 46 which are not manufactured from nickel or stainless steel, but from aluminum, for example, can fuse in the event of the occurrence of high short-circuit currents. In the embodiment proposed according to the disclosure, use is made of the stainless steel membrane 46 or the nickel membrane 46 which does not necessarily have the same metal alloy as the stainless steel housing 34 itself, which increases the electrical resistance and therefore permits a reduced current flow and has a higher melting point. By virtue of the mentioned parameters, the reliability of the galvanic element 10 proposed according to the disclosure, in particular in the form of a lithium-ion battery, is considerably improved. In addition, in the case of membranes 46 which are manufactured from aluminum material, as were previously used, there is the problem of such a membrane corroding or oxidizing in the event of moisture forming on the outside. By virtue of the selection of materials proposed according to the disclosure, this wear phenomenon is likewise counteracted.

It is furthermore apparent from the illustration shown in FIG. 3 that the fuse 32 in the form of a slot 42 is covered by a shield 44 manufactured from plastics material.

What is claimed is:

1. A galvanic element, comprising:
   a housing;
   a negative terminal;
   a positive terminal; and
   a plurality of collectors, a collector associated with each terminal,
   wherein the housing is a stainless steel housing which has a negative potential or a neutral potential,
   wherein the collector associated with the positive terminal includes a fuse directly connected to the positive terminal between the positive terminal and the collector,
   wherein the housing includes an opening associated with each of the positive terminal and the negative terminal, with a deformable membrane located in each opening, and
   wherein the deformable membrane in the opening associated with each of the positive and negative terminals is made from stainless steel or nickel and is electrically connected to the housing and is deformable to contact the corresponding one of the positive terminal and the negative terminal as part of an overcharge safety device at each of the positive and negative terminals.

2. The galvanic element according to claim 1, wherein the negative terminal and the collector associated therewith are made from copper.

3. The galvanic element according to claim 1, wherein the positive terminal and the collector associated therewith are made from aluminum.

4. The galvanic element according to claim 1, wherein the fuse is formed by an area of weakened cross section formed as an opening in the collector which is connected to the positive terminal of the galvanic element.

5. The galvanic element according to claim 4, wherein the opening is a slot.

* * * * *